United States Patent [19]

Makar

[11] 4,303,357
[45] Dec. 1, 1981

[54] QUICK-CHANGE HOLE SAW MANDREL

[76] Inventor: William Makar, 10849 NE. 3rd Ct., Miami, Fla. 33161

[21] Appl. No.: 151,417

[22] Filed: May 19, 1980

[51] Int. Cl.³ .................... B23B 41/02; B23B 31/44; B23B 5/22
[52] U.S. Cl. .................. 408/204; 279/1 A; 279/89; 408/226
[58] Field of Search ............. 279/1 A, 89, 90, 91; 408/191, 196, 197, 189, 204, 205, 206, 207, 209, 226, 228, 229, 230, 231, 232, 233, 703, 713, 203.5, 238, 239

[56] References Cited

U.S. PATENT DOCUMENTS

| | | | |
|---|---|---|---|
| 1,424,743 | 8/1922 | Smith | 279/89 |
| 1,841,635 | 1/1932 | Salmon | 279/1 A |
| 3,647,310 | 3/1972 | Morse | 408/239 |
| 3,784,316 | 1/1974 | Bittern | 408/204 |
| 3,880,546 | 4/1975 | Segal | 408/204 |

Primary Examiner—Harrison L. Hinson

[57] ABSTRACT

The present quick-change mandrel for attaching a hole saw to an electric drill has different sized oblong locking segments at its front end which match the usual oblong openings in the back of different sized hole saws. The hole saw is slid rearward over the corresponding locking segment and then is turned in peripheral grooves in that locking segment to engage behind rearwardly-facing shoulders on the locking segment. The reaction force on the hole saw when it is cutting into a workpiece forces it more tightly in the grooves.

6 Claims, 9 Drawing Figures

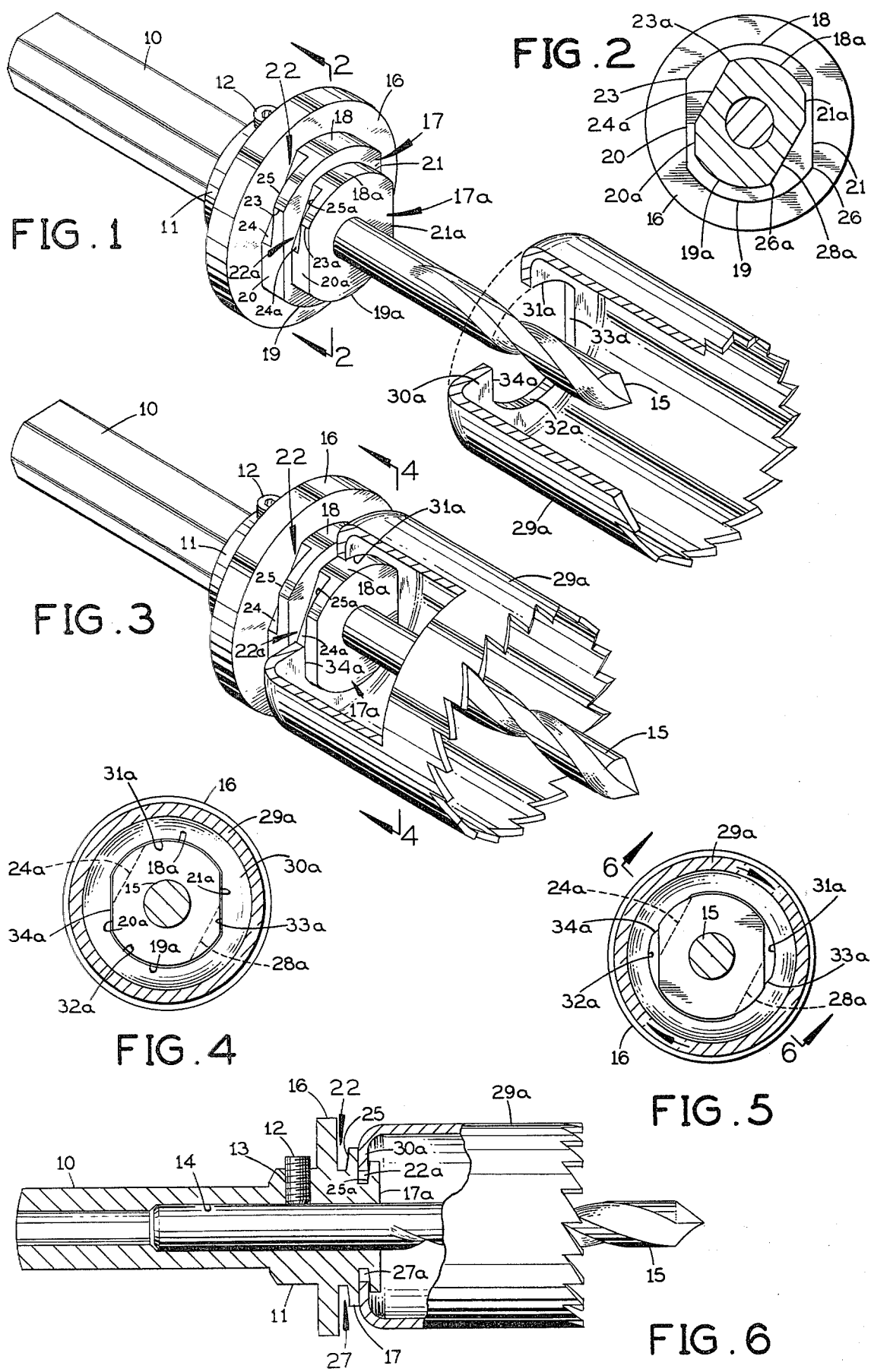

QUICK-CHANGE HOLE SAW MANDREL

SUMMARY OF THE INVENTION

This invention relates to a quick-change mandrel for attaching a hole saw to an electric drill.

Standard hole saws each comprise a cylindrical body with saw teeth at one end and a transverse end wall at the opposite end formed with an oblong opening defined by a pair of opposite circular edges and a pair of flat edges extending between the circular edges.

The present invention is directed to a novel mandrel for attachment to an electric drill which enables such hole saws to be readily attached or detached simply by sliding the hole saw over the mandrel and then rotating it a fraction of a turn. Preferably, the present mandrel can accommodate hole saws having different sizes of end wall openings.

In the presently-preferred embodiment, the mandrel of the present invention has a stem or shank for reception in the chuck of an electric drill and a pair of locking segments, one in front of the other, at the front of this shank. Each of these locking segments at its front end has an oblong shape complementary to the oblong shape of the end wall opening in a corresponding hole saw or set of hole saws, so that a selected hole saw can be slid rearward over the corresponding locking segment on the front of the mandrel. Each locking segment on the mandrel is formed with a pair of peripheral wedging grooves behind rearwardly-facing shoulders. After being slid rearward over the locking segment, the hole saw may be rotated a few degrees to lock its end wall in these grooves. In the use of the drill-powered hole saw, the reaction force of the workpiece against the hole saw tends to force it into the grooves behind the rearwardly-facing shoulders on the locking segment of the mandrel. That is, the reaction force tends to rotate the hole saw in the same direction in which it was initially turned manually into the grooves. The locking segments on the mandrel are formed with a central longitudinal bore which extends into the front end of the shank of the mandrel for slidably receiving the shank of a pilot drill. A set screw on the mandrel holds the pilot drill in the mandrel.

A principal object of this invention is to provide a novel quick-change mandrel for attaching a hole saw of standard design to an electric drill.

Another object of this invention is to provide such a mandrel which also holds a pilot drill for the hole saw.

Another object of this invention is to provide a novel quick-change mandrel for attaching any of several different sized hole saws of standard design to an electric drill.

Further objects and advantages of this invention will be apparent from the following detailed description of a presently preferred embodiment thereof which is shown in the accompanying drawings in conjunction with three different sized hole saws of standard design.

DESCRIPTION OF THE DRAWINGS

FIG. 1 is an exploded perspective view of the present mandrel and a small hole saw prior to assembly;

FIG. 2 is a cross-section taken along the line 2—2 in FIG. 1;

FIG. 3 is a perspective view showing the small hole saw slid onto the mandrel but not yet locked in place;

FIG. 4 is a cross-section taken along the line 4—4 in FIG. 3;

FIG. 5 is a view similar to FIG. 4, showing the position of the parts after the hole saw has been turned to its locked position on the present mandrel;

FIG. 6 is a longitudinal section taken along the line 6—6 in FIG. 5;

Figure 7:
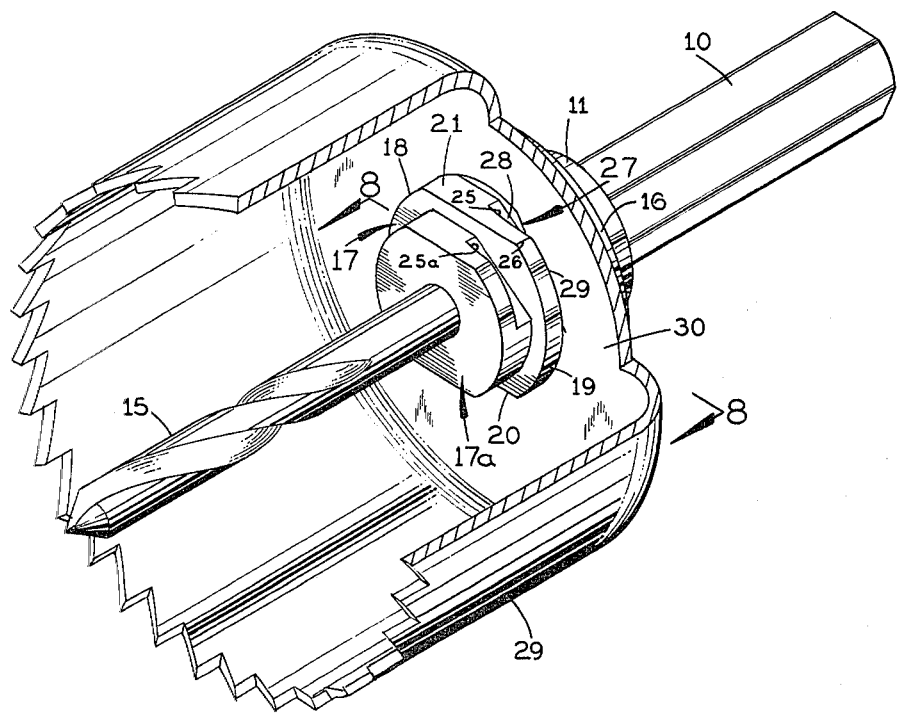
FIG. 7 is a perspective view, with parts broken away for clarity, showing a larger hole saw on a different portion of the present mandrel.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION

Referring to FIG. 1, the mandrel of the present invention comprises a hollow shank or stem 10 for insertion in the chuck of a conventional electric drill (not shown). An enlarged cylindrical collar 11 on the front end of this stem carries a set screw 12, which is threadedly received in a screw-threaded cross bore 13 (FIG. 6) which extends radially into a central longitudinal bore 14. The cylindrical shank of a pilot drill bit 15 is snugly but slidably received in the bore 14 and is locked in place therein by the set screw 12.

A transverse cylindrical enlargement 16 extends in front of the enlargement 11. At the front of the enlargement 16 an irregularly shaped first locking segment 17 presents diametrically opposed cylindrical surfaces 18 and 19 on its periphery and opposed flat surfaces 20 and 21 extending between these cylindrical surfaces, as best seen in FIG. 2. These surfaces provide an oblong configuration for the first locking segment which substantially matches the oblong configuration of the hole in the end wall of a corresponding hole saw or set of hole saws.

A diagonal groove 22 extends behind the corner 23 between curved surface 18 and flat surface 20. This groove is immediately in front of the enlargement 16 and is defined by a flat surface 24 extending obliquely from the flat peripheral surface 20 toward the cylindrical peripheral surface 18 and by a flat, rearwardly-facing surface 25 extending generally parallel to and in front of the front face of the enlargement 16. This rearwardly-facing surface 25 defines a first locking shoulder for a hole saw, as explained hereinafter.

A similar diagonal groove 27 (FIG. 7) is located behind the corner 26 between the cylindrical surface 19 and the flat surface 21. This groove is defined by a flat surface 28, which extends obliquely between the flat surface 21 and the cylindrical surface 19 directly in front of the enlargement 16, and by a flat, rearwardly-facing surface 29, which extends generally parallel to and in front of the front face of the enlargement 16.

Figure 8:
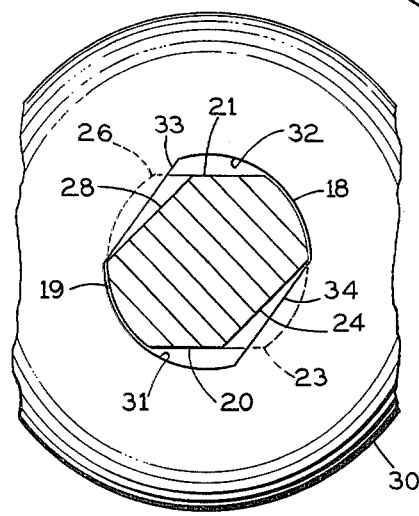
FIG. 8 is a cross-section taken along the line 8—8 in FIG. 7.

As shown in FIG. 8, the bottom faces 24 and 28 of the two grooves 22 and 27 extend parallel to and diametrically opposite one another.

As shown in FIG. 7, a relatively large (e.g., 1⅜ inch diameter) hole saw 29 of standard design may be slid rearward over the locking segment 17 and then rotated a small fractional turn into locking engagement in the grooves 22 and 27. The hole saw 29 has the usual flat end wall 30 formed with the usual oblong opening which is the same shape as, and just slightly larger than, the oblong front end of the locking surface 17, as defined by its edges 18, 19, 20 and 21. As shown in FIG. 8, the opening in the end wall 30 of the hole saw is defined by opposite circular edges 31 and 32 and opposite flat edges 33 and 34 extending between the circular edges. The opening in the hole saw initially is aligned with the front of the locking segment 17, so that the circular edges 31 and 32 of the hole saw opening can slide rearwardly over the cylindrical surfaces 19 and 18, respectively, on the locking segment 17, and the flat edges 33 and 34 of the hole saw opening can slide over the flat surfaces 21 and 20, respectively, on the locking segment 17.

When the back wall 30 of the hole saw 29 is moved back against the front of the enlargement 16, the hole saw 29 is turned to the locking position shown in FIG. 8, in which the flat edge 33 of the hole saw opening is behind the shoulder 29 at the front of the groove 27 and the opposite flat edge 34 of the hole saw opening is behind the shoulder 25 at the front of the other groove 22. This locks the hole saw 29 on the locking segment 17. The direction of rotation of the drill chuck and the angularity of the teeth on the hole saw 29 are such that the reaction force on the hole saw as it cuts into the work piece tends to turn the hole saw on the locking segment 17 in the same direction in which it was turned manually to the locking position. Stated another way, this reaction force on the hole saw tends to wedge it more tightly into the grooves 22 and 27.

As shown in FIG. 6, toward the right end of the locking segment recess 22 in FIGS. 1 and 5 the rearwardly-facing surface 25 on the locking segment 17 at the front of this recess is slanted or tapered to provide a wedging action against the back wall 30 of the hole saw as the latter rotates clockwise in FIGS. 1 and 5 with respect to the mandrel. At the opposite recess 27 in the locking segment 17 of the mandrel, the rearwardly facing surface of locking segment 17 at the front of this groove is similarily slanted adjacent its inner end, as shown in FIG. 6, for the same purpose. Because of these tapered surfaces at the recesses 22 and 27, the reaction force exerted on the hole saw by the workpiece causes its back wall 30 to become tightly wedged in the mandrel grooves 22 and 27 between the front face of the mandrel enlargement 16 and the rearwardly-facing, tapered or slanted surfaces on the locking segment 17 adjacent the inner end of each groove 22 and 27.

Figure 9:
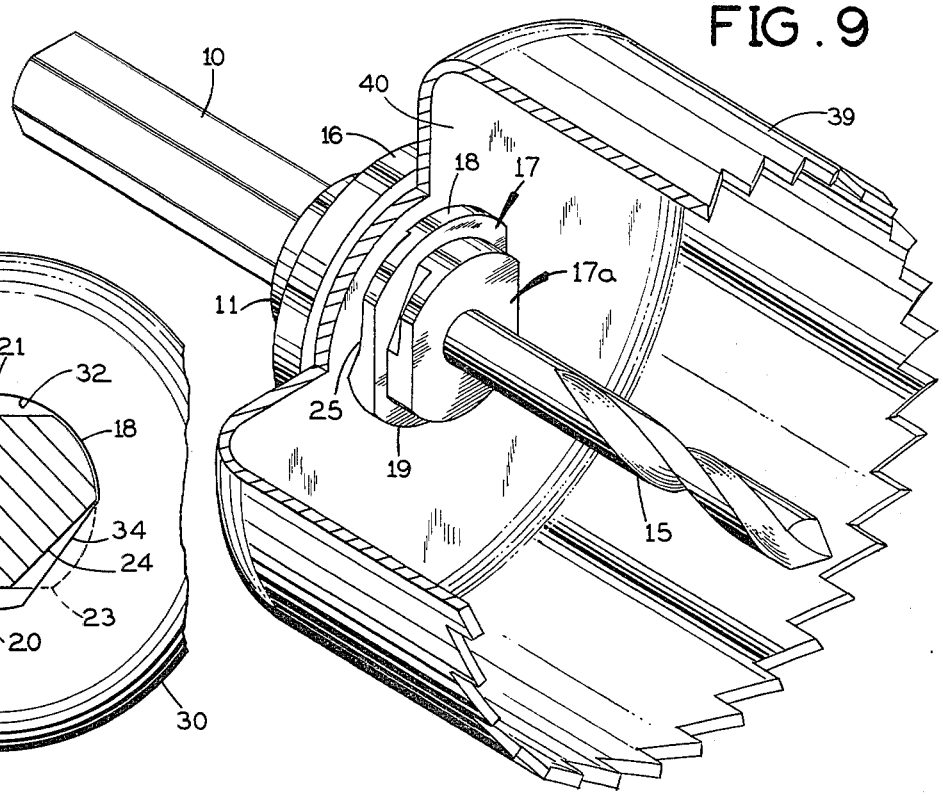
FIG. 9 is a perspective view, with parts broken away for clarity, showing a still larger hole saw on the present mandrel.

FIG. 9 shows an even larger hole saw 39 (e.g., 2½ inch diameter) mounted on the present mandrel in the same manner. The opening in the end wall 40 of the hole saw 39 in FIG. 9 is the same size and shape as the opening in the hole saw of FIGS. 7 and 8, so the assembly procedure is the same, and the detailed description of this assembly need not be repeated.

The present mandrel also is designed for the attachment of a substantially smaller hole saw than the one shown in FIGS. 7 and 8. The smaller hole saw is shown in FIGS. 1–6. In one practical embodiment, the smaller hole saw has a diameter of ⅞ inch and the hole in its end wall is substantially smaller than the one in the hole saw of FIGS. 7 and 8.

For holding this smaller hole saw, the present mandrel is formed with a second locking segment 17a on its front end directly in front of the first locking segment 17 and of the same shape as the latter. Corresponding elements of the second locking segment 17a are given the same reference numerals, but with an "a" suffix added, as those of the first locking segment 17. The smaller hole saw 29a (FIG. 1) has a rear wall 30a with an oblong opening therein which is defined by opposite circular edges 31a and 32a and opposite flat edges 33a and 34a. This opening in the hole saw is the same shape as, and slightly larger than the oblong front end of the second locking segment 17a on the front of the mandrel, so that the opening in the hole saw can be slid rearward over the locking segment 17a until the rear wall 30a of the hole saw abuts against the front of the first locking segment 17 on the mandrel. Then the hole saw 29a may be rotated clockwise in FIG. 2 to bring it into locking engagement in the grooves 22a and 27a in the second locking segment 17a on the mandrel in the same manner as already described for the larger hole saw. When this is done the flat edge 34a of the opening in the rear wall of the hole saw will be behind the shoulder 25a on the second locking segment 17a, and the flat edge 33a of the hole saw opening will be behind the shoulder 29a on the second locking segment 17a.

As shown in FIG. 6, the second locking segment 17a on the mandrel presents rearwardly-facing surfaces at the front of grooves 22a and 27a which are slanted or tapered to provide the already described wedging action against the rear wall 30a of the hole saw 29a. The slanted surface at groove 22a is identified by the reference numeral 25a in FIG. 6. With this arrangement, the reaction force on the smaller hole saw 29a causes it to be tightly wedged in the mandrel grooves 22a and 27a in the same manner as described for the larger hole saw 29 in the mandrel grooves 22 and 27.

From the foregoing description and the accompanying drawings, it will be apparent that the present mandrel enables the quick and reliable attachment of a selected hole saw to an electric drill. Several different sized hole saws can be accommodated. No change in the construction of the hole saw itself is required. The reaction force on the hole saw as it cuts into the workpiece when the electric drill is operated in the forward direction produces a torque which maintains the hole saw locked on the mandrel.

I claim:

1. For use with a hole saw having a cylindrical body with a circular series of saw teeth at one end and an opposite end wall with an oblong central opening therein, a quick-change mandrel for attaching said hole saw to an electric drill, said mandrel having a shank for reception in the chuck of an electric drill and having a locking segment on its front end, said locking segment having an oblong front end which is complementary to said oblong central opening in the hole saw for slidably passing said end wall of the hole saw rearward over said locking segment, said locking segment having peripheral grooves therein behind its oblong front end into which said end wall of the hole saw may be turned for locking engagement with said locking segment after being slid rearward over said locking segment, the improvement wherein:

each of said peripheral grooves has a tapered configuration near the end of that groove toward which the end wall of the hole saw is turned for locking engagement with the locking segment, whereby said end wall is wedged tightly in each groove because of the latter's tapered configuration.

2. A quick-change mandrel according to claim 1, wherein said locking segment defines rearwardly-facing shoulders at the front of said grooves for locking engagement by said end wall of the hole saw adjacent said oblong central opening therein, each of said shoulders being tapered near the end of the groove toward which said end wall of the hole saw is turned for locking engagement with the locking segment.

3. A quick-change mandrel according to claim 1, wherein there are two of said locking segments, one smaller than the other and directly in front of the other, for receiving different sized hole saws with different sized openings in their respective end walls.

4. For use with a hole saw having a generally cylindrical body with a circular series of saw teeth at one end and an opposite end wall with an oblong central opening defined by opposite circular edges and opposite flat edges extending between said circular edges, a quick-change mandrel for attaching said hole saw to an electric drill, said mandrel having a shank for reception in the chuck of an electric drill and having a locking segment on its front end, said locking segment having an oblong front end defined by opposite cylindrical edges and opposite flat edges which substantially match said circular and flat edges of the opening in the hole saw for slidably passing said end wall of the hole saw rearward over said locking segment, said locking segment having peripheral grooves therein extending behind corners between adjoining cylindrical and flat edges on the front end of said locking segment, said locking segment defining rearwardly-facing shoulders at the front of said grooves behind which said straight edges of the opening in the hole saw extend when the hole saw is turned in one direction after being slid rearward over the locking segment, the improvement wherein:

each of said rearwardly-facing shoulders is tapered near the end of the groove toward which said straight edges of the opening in the hole saw move when the hole saw is turned in said one direction.

5. A quick-change mandrel according to claim 4, wherein said one direction in which the hole saw is turned behind said shoulders on said locking segment is the same direction in which the hole saw is urged by the reaction force produced by the engagement of its saw teeth with the workpiece when the drill is operated in the forward direction.

6. A quick-change mandrel according to claim 5, wherein there are two of said locking segments, one smaller than the other and directly in front of said other, for receiving different sized hole saws with different sizes of said oblong opening therein.

* * * * *